UNITED STATES PATENT OFFICE.

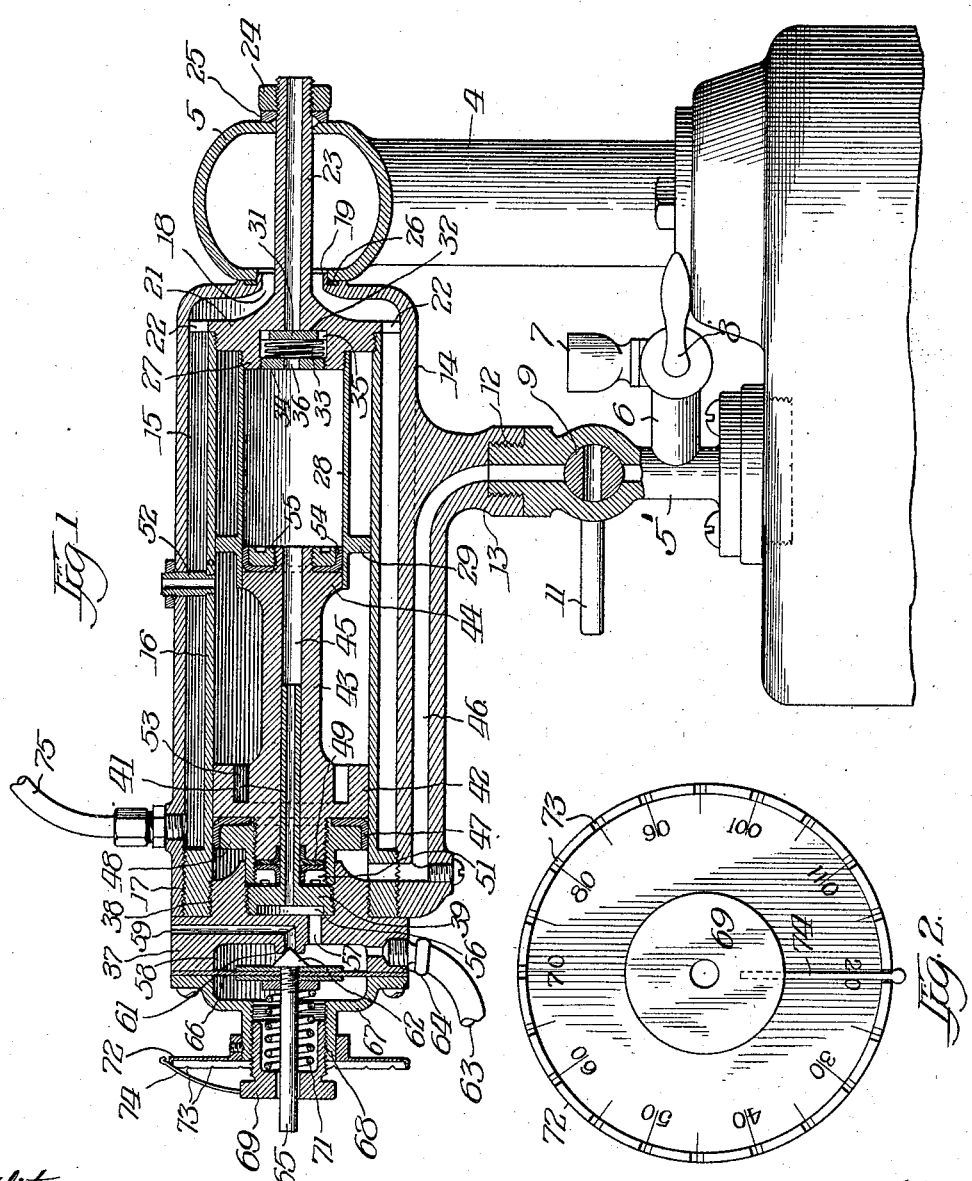

FRANK C. H. STRASBURGER, OF KNOX, INDIANA.

AUTOMOBILE-TIRE PUMP.

1,178,686.

Specification of Letters Patent. Patented Apr. 11, 1916.

Application filed August 6, 1914. Serial No. 855,357.

*To all whom it may concern:*

Be it known that I, FRANK C. H. STRASBURGER, a citizen of the United States, residing at Knox, in the county of Starke and State of Indiana, have invented certain new and useful Improvements in Automobile-Tire Pumps, of which the following is a specification.

This invention relates in general to air pumps, and has more particular reference to a pump adapted to supply air under pressure to automobile tires and the like, the embodiment of my invention disclosed in the present application being adapted for attachment to the engine of an automobile.

One of the primary objects of this invention is the provision of an air pump which will be constructed for attachment to a gas engine and adapted to be operated by the pressure exerted in one of the engine cylinders.

Another object is to provide the pump with a water jacket and to connect said jacket with the water cooling system of the engine so that the pump will be cooled from the engine cooling system.

A further object is the provision of a pump equipped with a manually adjustable device adapted to open the discharge of the pump to the atmosphere when the air pressure generated by the pump reaches a predetermined amount for which the device has been set, thereby automatically preventing the introduction of excessive and injurious pressure into the tires and securing a uniform pressure in each tire.

A further object is to provide a pump of this general character which shall be small and compact in construction, which will be strong and durable and which will be cheap to manufacture and efficient and accurate in its operation.

Other objects and many advantages of the invention will be readily apparent as the same becomes better understood by reference to the following description when considered in connection with the accompanying drawings.

Referring to the drawings—Figure 1 is a longitudinal sectional view of an automobile tire pump embodying my invention, and Fig. 2 is an end view of the tire pressure controlling device.

On the drawings reference character 3 designates the upper portion of a gas engine cylinder, which may be of any well known or preferred type, and reference character 4 indicates one of the branches leading from the manifold 5 of the water cooling system, with which automobile engines are customarily equipped. Upon the top of the engine cylinder there is mounted a stud or nipple 5' having a lateral branch 6 terminating in a priming cap 7 and equipped with a shut-off cock 8, of usual construction. The nipple 5' is equipped above the branch 6 with a turning plug 9 operated from a handle 11, and the upper end of the nipple is threaded as indicated at 12 to receive the correspondingly threaded boss 13 formed on the bottom of a pump casing 14.

The casing 14 is substantially cylindrical in shape and forms the outer wall of the water jacket 15 surrounding the primary cylinder 16 of the pump, the cylinder 16 being threaded into the open end of the casing 14 as indicated at 17. One end of the casing 14 is closed except for a centrally disposed opening or passageway 18 adapted to register with a corresponding opening 19 formed in the side of the water cooling manifold 5, water being admitted to the water jacket 15 from the manifold through the openings 18 and 19, as will be readily understood. The corresponding end of the primary cylinder 16 is closed by a plug 21 threaded into the cylinder 16 and provided with radially projecting fingers 22 contacting with the casing 14 to center and maintain the end of the cylinder 16 in proper position in the casing. It will be obvious, however, that the fingers 22 are not of sufficient area to obstruct the circulation of the cooling fluid through the water jacket 15. The plug 21 is provided with a centrally disposed tube 23 extending through the manifold 5 and threaded at its outer end to receive a nut 24 by means of which the casing 14 and the manifold are securely clamped together. For the purpose of effecting a water-tight joint around the openings through the manifold 5 I prefer to employ a gasket 25 interposed between the nut 24 and the outer wall of the manifold, and a gasket 26 interposed between the opposite walls of the manifold in the end of the pump casing.

The plug 21 is also provided with a concentric inwardly projecting boss or hub 27 which is threaded for connection with the tapped end of a secondary cylinder 28, of smaller diameter than the primary cylinder 16 and disposed concentrically therein. A radial flange 29 formed a short distance from the opposite end of the secondary cylinder serves to assist in maintaining the secondary cylinder in proper position. The tube 23 forms an air inlet in the passageway through which air is supplied to the secondary cylinder, reverse flow of air from the cylinder through the tube being prevented by a check valve comprising, as shown in the present instance, a disk 31 held against its seat 32 formed in the plug 21 by a coiled expansion spring 33 interposed between said seat and a stationary disk threaded into the plug 21. Air is admitted to the secondary cylinder through the peripheral notches or ports 35 in the valve disk 31 and a central port 36 formed in the disk 34.

The opposite end of the primary cylinder 16 is closed by a closure 37 threaded into the cylinder, which is tapped to receive the same at 38, and this closure is provided on its inner face with a centrally disposed tapped socket into which it threaded a member 39 having a tubular extension 41 which projects axially into the primary cylinder 16. A primary piston 42 fitted in the primary cylinder, is integrally connected by a shank 43 with a secondary piston 44 fitted in the secondary cylinder 28, the two pistons being adapted to reciprocate together in their respective cylinders as a unit. The pistons and the shank are provided with a continuous longitudinal bore 45 in which the tubular extension 41 of the member 39 loosely fits. A passageway 46 in the pump casing 14 opens at one end into the primary cylinder between the primary piston and the closure 37 and at its other end communicates with the bore of the nipple 5' so that when the turning plug 9 is in open position direct communication will be established between the engine cylinder 3 and the primary cylinder 16. When gas is compressed in the engine cylinder it will be forced through this passageway into the primary cylinder of the pump thereby moving the pistons to the right, viewing Fig. 1, to displace the air from the secondary cylinder 28 through the bore 45 and the tube 41. The pump is designed to operate under a simple compression of the gases from the engine cylinder, in which case the spark to the cylinder 3 will be disconnected, or if preferred, the spark to this cylinder may be left on, in which case the explosion will operate the pump pistons. Upon the suction stroke of the engine piston the pump pistons will be returned to the normal position shown in Fig. 1, under the influence of the suction exerted in the engine cylinder.

For the purpose of preventing the escape of gas around the primary piston I prefer to employ a packing ring 47 of asbestos or other suitable material, held in position by a jam nut 48. If preferred, however, rings similar to the piston rings of a gas engine may be employed in lieu of the packing ring shown. To prevent the escape of gases through the primary piston around the tube 41 I employ a plurality of packing rings 49, retained in position by a ring 51 threaded into the outer end of the jam nut 48.

It will be apparent from an inspection of Fig. 1 that the reduced portion of the jam nut 48 fits relatively snugly into the central socket of the closure 37, with the result that upon the return stroke of the piston a quantity of gas will be trapped in the socket to serve as an air cushion for absorbing the shock incident to the final movement of the piston. A short length of pipe 52 establishes communication between the interior of the cylinder 16 and the atmosphere to permit ingress and egress of air in front of the primary piston as the piston reciprocates. It will be observed that the pipe 52 is spaced a short distance from the radial flange 29 on the secondary cylinder and that the inner end of the secondary cylinder terminates substantially in alinement with the pipe 52. The inner face of the piston 42 is provided with an annular groove 53, the outer wall of which is adapted to slidingly embrace the opposed end of the secondary cylinder so that a quantity of air will be trapped between the flange 29 and the face of the primary piston after the piston passes the pipe 52 on its operative stroke. This trapped air serves as an air cushion to absorb the shock of the pistons at the end of their operative stroke.

The secondary piston 44 acts as the operating or compression piston for pumping the air, and in order to prevent the escape of air around the piston I have equipped the same with a piston ring or packing 54, preferably held in place by a ring or nut 55 threaded onto the end of the piston 44 as shown in Fig. 1. It will be obvious from the description thus far that the gases under pressure from the engine cylinder, acting on the outer face of the primary piston, will move the secondary piston to the right, viewing Fig. 1, thereby forcing the air in the secondary cylinder out through the bore 45 and the tube 41. Upon the return stroke of the pistons, induced by the suction in the engine cylinder, the check valve 31 will open to admit air to the secondary cylinder through the inlet tube 23.

The outer face of the member 39 is provided with a depression 56 forming a continuation of the passage through the tube 41, and the closure 37 is provided with a passage 57 communicating at its end with the depression 56 and at its other end with a chamber 58 formed in the outer face of the closure 37. A by-pass 59 is adapted to establish communication between the chamber 58 and the atmosphere, the inner end of the by-pass being provided with a valve seat 61 adapted to be engaged by a tapered valve 62 which normally closes the by-pass. When the pump is in operation and the valve 62 is closed the air delivered from the secondary cylinder through the bore 45, the tube 41, the depression 56, and the passage 57 will be discharged from the chamber 58 through a hose or tube 63 adapted to be threaded into a socket 64, said hose being connected at its other end with the tire to be filled or leading to any point where the air is to be used.

The desirability of introducing just the required amount and no more of air into each tire is well understood, and with this object in view I have designed mechanism for controlling the valve 62 so that this valve may be set to open at a predetermined pressure, with the result that when the tire has been pumped up to the required pressure the valve will automatically unseat, thereby opening the by-pass 59 and permitting the air, subsequently pumped, to be delivered direct to the atmosphere. With this end in view the stem 65 of the valve 62 is secured to and carried by a diaphragm 66 disposed over the chamber 58 and held in position by a cap 67 having a central internally threaded boss 68. An adjusting nut 69 is threaded into the boss 68 and a coiled expansion spring 71, interposed between the nut 69 and the diaphragm, normally holds the valve 62 against its seat. A dial 72 is rigidly secured upon the boss 68, the face of the dial being graduated to pounds and provided with notches 73 on its periphery adapted to be engaged by a spring finger 74 carried by the nut 69. It will be evident that by adjusting the nut 69 the tension of the spring 71 may be increased or diminished, as desired, and the number of pounds pressure in the chamber 58 necessary to raise the valve 62 from its seat by means of the diaphragm 66 will be indicated on the dial by the finger 74. If eighty pounds pressure, for instance, is desired in the tire the nut 69 is turned until the finger 74 is engaged in the notch 73 indicated by 80. When the pump is set in operation air will be delivered under pressure through the hose 63 until eighty pounds pressure has been accumulated in the tire. The diaphragm 66 will thereupon be operated to unseat the valve 62, thereby opening the by-pass 59 and permitting subsequently pumped air to escape directly to the atmosphere.

It will be evident from the foregoing that I have designed a pump adapted to be actuated by pressure from an engine cylinder and that the pump is kept cool from the engine cooling circulating system. A pipe or tube 75 is preferably connected with the water jacket 15 at one end and at its other end to the return pipe of the circulating system to insure a circulation of cooling fluid through the pump jacket. The manually adjustable valve 62 may be adjusted to open under any desired pressure and by means of this automatic valve all danger of over inflating the tires is eliminated.

The device is simple and compact in construction and may be thrown into and out of operation by simply opening or closing the valve 9.

The construction and operation of my invention should be apparent from the foregoing without further description and it should be obvious that the mechanical details shown and described are capable of considerable modification within the scope of my invention.

I claim:

1. The combination with a gas engine comprising a cylinder and a water cooling system therefor, of an air pump, comprising a cylinder and a piston mounted to reciprocate therein, connections between said engine cylinder and said pump cylinder through which said pump piston is operated by pressure from the engine cylinder, a water jacket surrounding said pump cylinder, and connections between said water jacket and said water cooling system through which water is supplied from said cooling system to said water jacket.

2. The combination with a gas engine including a cylinder and a water cooling system, of an air pump including a cylinder connected with the engine cylinder, a piston in said pump cylinder adapted to be actuated by pressure from the engine cylinder, and a water jacket surrounding said pump cylinder and connected with said water cooling system whereby said pump is cooled.

3. In an air pump, the combination of a primary cylinder, a secondary cylinder, a pressure-operated primary piston mounted to reciprocate in said primary cylinder, a secondary piston disposed in said secondary cylinder and rigidly connected to and operated by said primary piston, a check valve-controlled passage through which air is supplied to said secondary cylinder, a discharge passage leading from said secondary cylinder including a chamber, a diaphragm disposed in said chamber, a valve carried by said diaphragm, a passage leading from said chamber to the atmosphere and terminating in a seat adapted to be closed by said valve, a spring tending to normally retain said valve against its seat, and manually adjustable means for adjusting the tension of said spring so that said valve will open only when the air pressure in said discharge passage reaches the point for which said spring has been adjusted.

4. In an air pump, the combination of primary and secondary cylinders, a water jacket surrounding said primary cylinder, primary and secondary pistons rigidly connected together and adapted to reciprocate in said respective cylinders, a passageway opening into said primary cylinder at one side of said primary piston through which pressure may be admitted from a gas engine cylinder to operate said pistons, a check valve-controlled passage for supplying air to said secondary cylinder, a passageway leading through said pistons through which air under pressure is discharged from said secondary cylinder, a by-pass leading from said discharge passageway to the atmosphere, a valve for closing said by-pass, a spring normally holding said valve in closed position, an adjustable device for regulating the tension of said spring, and a diaphragm connected with said valve by means of which the valve is opened by pressure in the discharge passageway against the force of said spring when said pressure becomes sufficiently great to overcome the adjusted tension of said spring.

5. The combination with a gas engine including a cylinder, a piston therein and a water cooling system, of an air pump comprising a cylinder and a piston therein, a connection between said engine cylinder and said pump cylinder through which the pump piston is actuated from the engine piston, and a water jacket surrounding said pump and connected with the water cooling system of said engine whereby said pump is cooled.

FRANK C. H. STRASBURGER.

Witnesses:
IRA J. WILSON,
A. G. LATIMER.

Copies of this patent may be obtained for five cents each, by addressing the "Commissioner of Patents, Washington, D. C."